Jan. 23, 1951 S. J. BEGUN 2,538,892

SYSTEM TO PREVENT ACCIDENTAL RECORDING ON A MAGNETIC RECORD

Filed Dec. 4, 1946 5 Sheets-Sheet 1

INVENTOR.
S. J. BEGUN
BY Pinelus + Greene
ATTORNEYS

INVENTOR.
S.J. BEGUN
BY
Pinelas & Greene
ATTORNEYS

Jan. 23, 1951 S. J. BEGUN 2,538,892

SYSTEM TO PREVENT ACCIDENTAL RECORDING ON A MAGNETIC RECORD

Filed Dec. 4, 1946 5 Sheets-Sheet 3

INVENTOR.
S. J. BEGUN

BY

Pinelles & Greene

ATTORNEYS

INVENTOR.
S. J. BEGUN
BY Pineles & Greene
ATTORNEYS

INVENTOR
S. J. BEGUN
BY Pinelles & Greene
ATTORNEYS

Patented Jan. 23, 1951 2,538,892

UNITED STATES PATENT OFFICE 2,538,892

SYSTEM TO PREVENT ACCIDENTAL RE-RECORDING ON A MAGNETIC RECORD

Semi J. Begun, Cleveland Heights, Ohio, assignor to The Brush Development Company, Cleveland, Ohio, a corporation of Ohio Application December 4, 1946, Serial No. 713,963

10 Claims. (Cl. 179—100.2)

This invention relates to a magnetic recording apparatus for recording, erasing or reproducing magnetic signals on a moving magnetic record track.

Among the objects of this invention are novel magnetic recording and reproducing devices embodying features which make it impossible to inadvertently erase or superimpose recording flux on a magnetic record which it is desired to keep intact and free from magnetic disturbances.

The foregoing and other objects of the invention will be best understood from the following description of exemplifications thereof, reference being had to the accompanying drawings wherein Fig. 1 illustrates a magnetic recording and reproducing apparatus according to the invention;

In the wide use of home type magnetic recording and reproducing apparatus it is extensively possible for laymen to prepare very high quality magnetic recordings at home. Radio programs, for example, can be excellently recorded on limp magnetic recording tapes having a stratum of bonding compound containing substantially uniformly dispersed therein permanently magnetizable powder particles, such as are described in the copending applications of Otto Kornei, Serial Nos. 685,092 and 685,093 filed July 20, 1946, which latter application has been abandoned. For certain purposes, as for example, when a desired recording is not available in any other manner a reel of magnetic recording medium having magnetically recorded thereon such a recording may be purchased. Hitherto all magnetic recorders have been made with a single magnetic track guide path for erasing, recording or reproducing. The ease of making magnetic recordings or of erasing prior magnetic recordings may often be disastrous to a commercial recording which can easily be run through such prior recorders with the control switch inadvertently set to "erase" or "record," and in a few minutes erase an expensive recording to nothing but a blank magnetic track which can be readily purchased at small cost, or superimpose another recording and thereby ruin the expensive recording beyond recovery of anything but the blank record track.

According to the invention this difficulty is avoided by providing record track structures having an elongated record track channel suitably held in compact form as for example, on a record track reel or sheet and imparting to the record track structures of the commercial recordings a characteristic to which the home type recording and reproducing apparatus is sensitive and which does not permit the alteration of the recording. The features of the invention may be utilized with conventional reels of filamentary record track, with endless reels such as those illustrated in the Miller application, Serial No. 588,911 filed April 18, 1945, now Patent No. 2,426,838, granted September 2, 1947, or with a continuous record track forming spaced portions of a magnetizable sheet having an extended surface which moves with respect to a transducing head, to magnetically link successive portions of the surface, as described in the Williams application Serial No. 651,637, filed March 2, 1946, which issued as Patent Number 2,426,838 on September 2, 1947.

Figure 1:
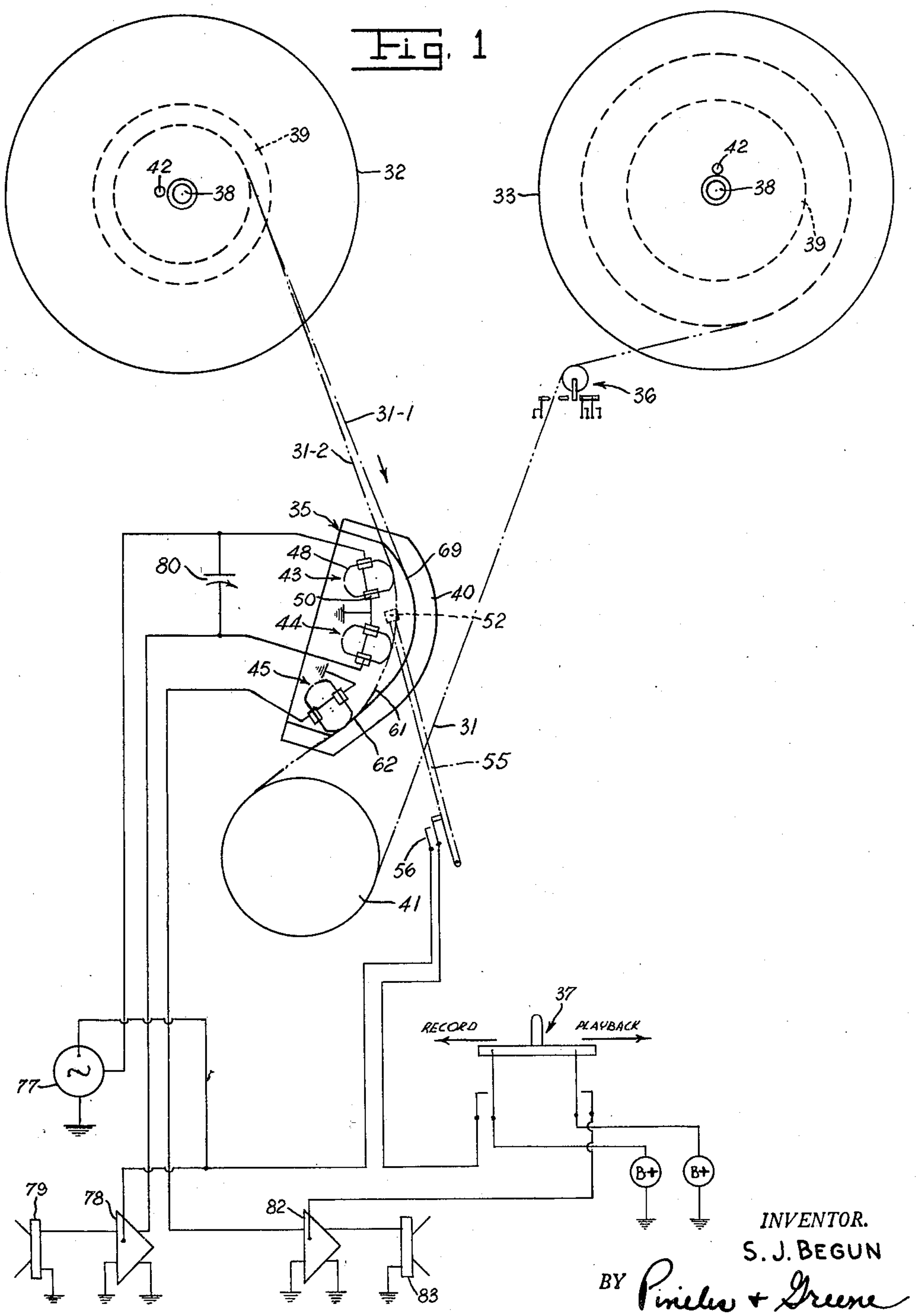
Fig. 1A is an enlarged view of one form of magnetic head assembly embodying the invention.

In Fig. 1 is shown diagrammatically one embodiment of the invention wherein a magnetic record track in the form of a tape 31 is unwound from a supply reel 32 and wound onto a take-up reel 33. A magnetic head assembly structure 35 having a guide portion 40 is disposed so that the record tape 31 is led over the guide portion 40 and around a rotating capstan 41. The capstan includes heavy portions and the tape contacts the roller portion of the capstan along a maximum amount of its periphery. The large moment of inertia of the capstan helps to impart constancy to its rotation, and the large area of contact with the tape provides good driving means for withdrawing the tape over the guide portion 40 of the magnetic head assembly structure 35, and for feeding the tape to the take-up reel 33. A limit switch assembly 36 is interposed in the record track path to assist in controlling the record track reeling operations. The head assembly 35 contains three magnetic heads, an erasing head 43, a recording head 44, and a reproducing head 45.

The guide structure 40 provides an outer guide path 69 and an inner guide path 61, both guide paths coming together at their extreme portions. The reproducing head 45 is placed in contact with the combined guide paths in that portion 62 of the head assembly 35 where the record track 31 leaves the head assembly in its forward reeling path from the supply reel 32 to the take-up reel 33, as indicated by the arrow.

The erasing head 43 and the reproducing head 44 are placed in contact with the inner guide path 61 where it is separated from the outer guide path 69 so that the tape 31 in moving along the outer guide path 69, as indicated by the dash-dot line 31—1, does not contact the erasing or recording heads 43, 44 and only contacts the reproducing head 45. In this outer guide path 69 the record track is beyond the magnetic influence of the erasing and recording heads 43, 44, and erasing and recording operations cannot be effected. Along the inner guide path, as indicated by the dash-double-dot line 31—2, the record track contacts all three magnetic heads so that erasing, recording and reproducing, or any combination of these, may be effected. The magnetic heads 43, 44, 45 may be identical, each containing a magnetic core 48 surrounded by transducing windings 50, as is well known in the art. A sensing member 52 mounted on a pivoted arm 55 is shown as interposed in the inner guide path 61 for operation of a switch 56. The sensing member 52 may be positioned to project through the floor or a wall of the guide path, and biased so as to be actuated by the presence of record track in the inner guide path, to a position which closes the switch 56.

Fig. 1 indicates a wiring diagram that may be used for controlling the recording and playback operations. One terminal of the windings of each core is grounded. The other terminal of the recording head 44 is connected to the output of recording amplifier 78, the other terminal of the playback head 45 being connected to the input of playback amplifier 82, and the ungrounded terminal of the erasing head 43 to the output of the high frequency oscillator 77.

A suitable signal source, such as the microphone 79, feeds the input of recording amplifier 78, and a signal reproducing device, such as the loud speaker 83, is fed by the output of reproducing amplifier 82, the circuits being completed by the ground connections shown. A capacitor 80 feeds some of the high frequency output of oscillator 77 to the recording head 44 so as to provide the necessary A. C. bias for recording.

Switch 37 acts to selectively connect suitable power sources, indicated by the circled B+ signs, to the amplifier 82, and via switch 56 to the amplifier 78 and high frequency oscillator 77 so that in the left-hand record position, when record track is present in the inner guide path, the recording amplifier 78 provides a recording flux in the recording head 44, and the oscillator 77 simultaneously provides an erasing flux in the erasing head 43 and an A. C. biasing flux in the recording head. The exclusion of record track from the inner guide path 61, as by constraining it to travel along the outer guide path 69, makes recording and/or erasing impossible both because the open switch 56 will prevent operation of the erasing and recording cores 43, 44 and because record track in outer path 69 is not magnetically linked with these cores.

Either of these preventative features may be relied on without the other, if desired. The apparatus of Fig. 1 will, accordingly, be suitable without the auxiliary switch control responsive to the presence of record track. The switch control may be employed by itself, in which event the magnetic cores may be placed along a common guide path such as position 62 with only the sensing member 52 situated on one of two selective guide channel portions such as 61 and 69. In the right-hand playback position the switch 37 disconnects the oscillator 77 and the amplifier 78 from the power supply, and connects the playback amplifier 82 with its power supply so that recordings may be reproduced in the reproducer 83. The switch 37 in the intermediate position shown disconnects all power supplies so that the apparatus is inoperative.

The reels 32, 33, shown distorted as to size, are mounted on rotatable shafts 38, shown as having collars 39 upon which the reels rest. Projecting from the upper surface of collars 39 are pins 42 which are engaged by corresponding openings of the hubs of the reels and serve to transmit rotational forces upon the shafts of the reels. Suitable means may be provided for actuation of the shafts 38 and the capstan for effecting the desired reeling operations as is well known in the art.

The selection of the guide path along which the record track moves is placed beyond the control of the operator, as for example, by suitably shaping the walls bounding the guide structure 40 so that record tracks of one shape will be moved along the inner guide path 61, whereas record tracks of other shapes will not be permitted to enter the lower guide path 61 and will be held away and move along the outer guide path 69.

Figures 1A, 2, 7, 13:
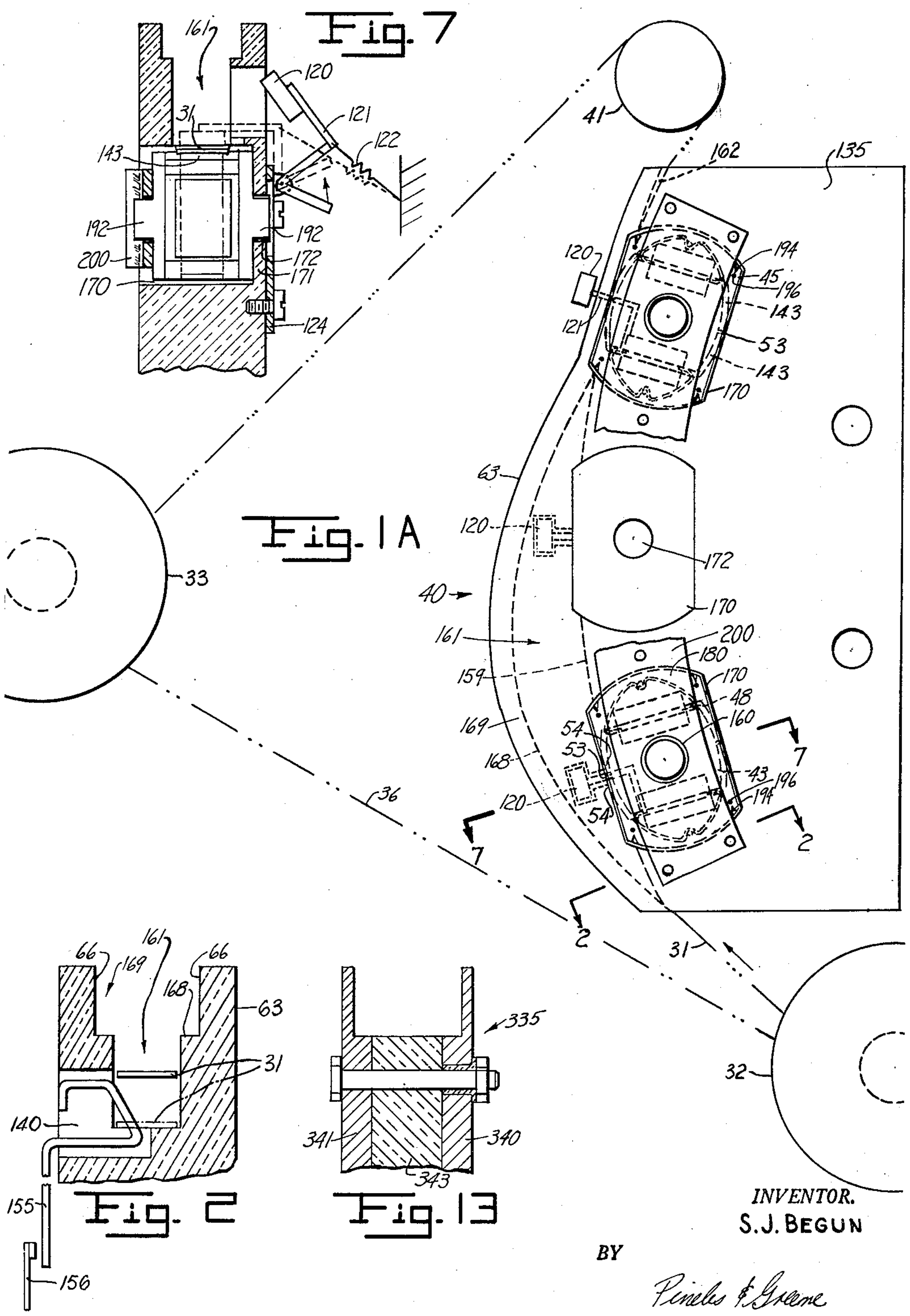
Fig. 2 is a sectional view of the assembly structure of the head assembly of Fig. 1A along line 2—2.
Fig. 7 is a cross-section of the head of Fig. 1A along the line 7—7.
Fig. 13 is a sectional view similar to Figs. 12 and 10 of a still further form of the invention.

Fig. 1A is an enlarged view showing in greater detail the construction of a head assembly 135 according to the invention. The head assembly 135 may be molded or machined as an integral member having side walls 63 and three laterally disposed openings 170. Along the guide portion 40 of the head assembly 135 a deep channel 161 is provided, the floor 159 of this channel defining an inner record track guide path.

A portion of the walls 63 that define the sides of the guide channel 161 are hollowed, as indicated at 66 in Fig. 2, to provide internal shoulders 168 extending over most of the length of the guide portions 40. The shoulders 168 are situated externally of the floor 159 of the channel 161 and define the two marginal regions of another guide channel 169. The guide channels 161, 169 are convexly shaped and the distance between the respective floors 159, 168 varies along the assembly structure 135 in a manner similar to that shown in Fig. 1, being at maximum in an intermediate zone and decreasing to zero at the ends of the channel.

Fig. 2 illustrates one form of sensing construction in which the sensing arm 155 which may be a light-weight wire is suitably shaped and positioned so that one end penetrates into the inner channel 161 through a slot 140 in a wall 66. The wire may be secured so that its flexibility permits it to be actuated by the entrance of the record track into channel 161 to actuate the recording and for erasing through switch 156.

The openings 170 extend through the floor 159 but do not extend completely through the thickness of the head assembly 135, leaving a wall 171, as indicated in Figs. 1A and 7. Smaller passageways 172 extend through the wall 171 axially of and communicate with the openings 170.

Magnetic heads 180 are placed within the openings 170, as indicated in Fig. 1A wherein only two of the heads, the erasing head 43 and the playback head 45, are shown mounted in place. Each of the heads contains a magnetic core 48 which may be made up of two generally C-shaped thin pole pieces 143 mounted so as to form a substantially closed magnetic path including two small non-magnetic gaps 53. Each of the pole pieces 143 may be surrounded by a transducing winding 150.

As shown in greater detail in Figs. 4, 5, 6 and 6A, the magnetic head 180 is formed by mounting the pole pieces 143 on a mounting member 181 so shaped as to receive the pole pieces 143 as well as the transducing windings 150, the heads 180 being disposed so that one of the pole piece gaps 53 as well as the surrounding pole portions 54 are exposed along the general contour of the floor 159. The mounting member 181 is shown as a molded or machined unit having two generally flat sides 190 each with a periphery which has convex regions 183 and flat regions 184 so as to provide a contour which generally resembles that of openings 170. On each of the flat sides are a pair of inwardly directed shoulders 187 as well as pole piece supporting structures 188. The pole piece supports 188 integrally connect the opposing sides 190 of the mounting member 181. Centrally projecting exteriorly from each side 190 is a circular boss 192 shaped to fit in the passageway 172. A groove 186 extends transversely through the mounting member 181 between the pole piece supports 188 and accommodates the windings 150. The pole pieces 143, intermediate regions of which carry the windings 150, are mounted on the pole piece supporting structures 188 so that the windings fit inside the groove 186 and the pole portions 54 of the two pole pieces disposed near the flat faces and are spaced by a suitable non-magnetic gap. A small groove 193 may be provided in the pole piece supporting structures 188 immediately below the non-magnetic gap region so as to facilitate the adjustment of the gap. C-shaped leaf springs 195 shown supported against pins fitting through openings 197 in the sides 190 are shown as urging the pole pieces 143 against the pole piece supports 188 so as to retain the pole pieces in place. Some of the lateral faces of the pole piece supports 188 may be cut away to provide small wedge-shaped gaps 199 under the pole pieces 143. The urging by spring 195 causes the pole pieces to bend slightly into the gaps 199 and makes for more secure assembly.

The entire magnetic head construction is similar to that described in the application of Otto Kornei, Serial No. 688,034, filed August 2, 1946, which issued as Patent No. 2,523,576 on September 26, 1950, and is positioned in opening 170 so that the shoulders 187 form a general continuation of the surface of the floor 159 and the pole portions 54 of the pole pieces emerge above the floor to a very small extent to provide a slight amount of increased tension on the tape as it is impelled along a guide channel. To help in such positioning of the magnetic heads, the opening 170 may be slightly larger than the mounting member 181 and the passageway 172 slightly larger than the boss 192 so that when a fastening plate 200 containing corresponding apertures 160 is mounted against the exposed side 190 and around the exposed bosses 192 the bosses will project from both sides of the assembly structure 35 and can be grasped and moved to properly position the head before the plate 200 is securely fixed in place.

As shown the reproducing head is mounted in the terminal portion of the assembly structure 135 where the channels are at the same level. The erasing and recording heads are mounted in the floor 159 of narrower channel 161 in those regions where the ledges 168 are some distance removed from this floor 159, as shown. The magnetic heads may be identical in which case they should be wide enough to accommodate the wider tape passing through channel 169 since the reproducing head must operate in conjunction with either tape. Such a construction is indicated in Fig. 7 wherein the extra head width does not interfere with its operation in the narrower channel 161. It is obvious, however, that the reproducing head 45 may have a tape guiding width larger than the corresponding width of magnetic heads 42 and 43.

With the arrangement illustrated commercial recordings on tape too wide to fit into narrow guide channel 161 may be obtained and run through the assembly structure 135 with no possibility of erasing or superimposed recording taking place. On the other hand, there may also be obtained reels of record tape narrow enough to fit into the guide channel 161, and on such narrow tapes radio programs, telephone conversations or other sound sequences may be recorded, erased and re-recorded at will. Any inadvertent setting of the controls to "record" or "erase" will have no effect on the wider tape.

Figure 3:
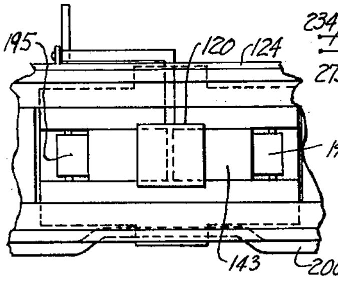
Fig. 3 is a top view of the head construction of Fig. 1A.

In a practical construction, such as is shown in Figs. 1 through 7, the convexity of the floor 159 of the narrower channel 161 in the assembly structure 135 is minimized so as to diminish the frictional forces against the tape as it slides along the assembly structure 135. With the small convexity of floor 159, not enough pressure is applied between the tape and the pole portions 54 of the magnetic heads, and pads 120 are provided and mounted on pivoted arms 121 so disposed that by actuation of the arms 121, into the operative position shown in dotted lines in Fig. 7, the pads 120 will rest on the tape and press it against the pole portions 54 so as to maintain stable magnetic contact and linkage between the magnetic core and the successive elements of the magnetic tape as they pass the gap 53. Enough freedom of rotation is provided for the arms 121 so that in the non-operative position, shown by the solid lines of Fig. 7, the pads 120 are completely removed from the guide channels to enable simple threading of the tape along the channel. The pads may be made of felt or other soft resilient material. The arms 121 may be offset, as shown in Fig. 3, so as not to obstruct the easy access to the adjacent projecting boss 192 and may be pivoted on a plate 124 attached to the lower side of assembly structure 135. The assembly structure may be provided with fastening means, as shown, to securely hold it suitably positioned in the apparatus. The dash-double-dot line 36 shown in Fig. 1A is the path along which the tape may be rapidly wound from one reel to another without passing in contact with any of the magnetic heads. The path 36 may be used for rewinding or fast forward reeling. In the drawing the record tape thickness is greatly exaggerated in the interest of clarity.

The guiding of narrow tape through the narrow channel 161 will satisfactorily center it on the reproducing head 43 which is only provided with wider guides. If desired, however, additional narrow guide means may be provided on the capstan side of reproducing head 45, as for example, by grooving the floor of the channel at this point to form a narrow tape guide channel 162 shown in Fig. 1A.

Figure 8:
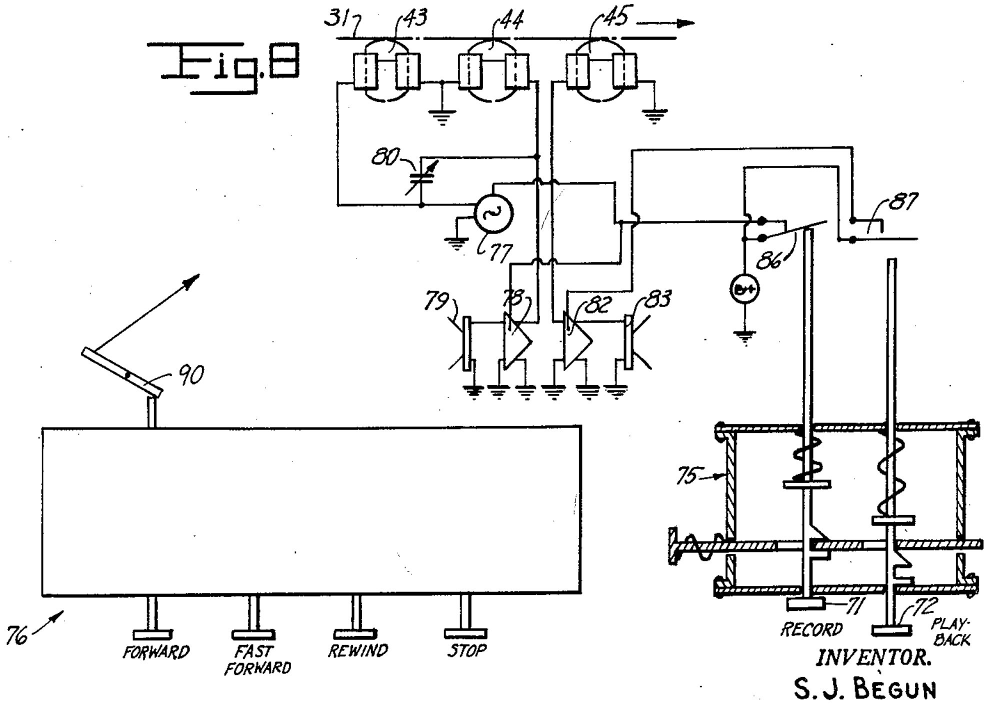
Fig. 8 illustrates a wiring diagram suitable for use with the invention.

The windings of the magnetic cores may be connected, as indicated in Fig. 8, wherein a pair of push buttons 71, 72 in the conventional two push button assembly 75, control respectively the recording and the playback operations. As is well known, the push button assembly is so arranged that either button may be pushed into its operative position, and that when one is pushed in the other is unlatched and pops out under the action of a biasing spring. However, both buttons may be pushed in if simultaneously actuated.

On each core the windings are connected in series, one end of the erasing core windings being connected to an oscillator 77 and one end of the windings of the recording core 44 is connected to the output of recording amplifier 78 in an arrangement similar to that shown in Fig. 1. The playback core 45, playback amplifier 82, signal reproducing device 83, signal source 79 and variable coupling capacitor 80 are also similarly connected. The B+ supply for operating the oscillator 77 and the amplifiers 78, 82 is indicated by the circled B+ in Fig. 8 and is led to these units through switches 86, 87 which are operated by the shaft of the push buttons 71, 72 respectively, as shown. With the record button pushed in and the playback button out the B+ is supplied to the recording amplifier 78 and the oscillator 77 so that a proper recording of signals may be obtained. Pushing in the playback button 72 permits the recording button 71 to pop out and removes the B+ supply from the recording amplifier 78 and the oscillator 77, and establishes a B+ supply to the playback amplifier 82, thus permitting the reproduction of the recording. By suitable manipulation both recording button 71 and playback button 72 may be maintained in their operative inwardly pushed position so that a recording may be made and immediately played back for monitoring or other purposes. In a practical embodiment of the apparatus the connections to the windings 159 may be made by means of pins 196 mounted in one side 190 of the mounting member 181, the ends of the windings being led over notches 194 and fastened to pins 196.

Other operating means, such as the second push button assembly 76, may be used to control the tape impelling means so as to operate the tape in the regular forward direction for recording or reproducing, rapidly in forward direction for quickly locating a desired spot in a long recording, or in rewind direction for rapidly rewinding. Driving means, such as motors, may be suitably mounted and connected with the supply reel 32, take-up reel 33 and the capstan 41, and may be suitably connected with switches operated by the push buttons of the assembly 76. Mechanical or electrical interlinkage may be provided for actuating the arms 121 when the forward push button is pushed so as to bring the pads 120 into contact with the tape to establish stable magnetic linkages with the respective magnetic heads. A biasing spring 122 retracts the arms 121 into inoperative position when the forward push button is in its outer or inoperative position, as for example, when any of the other buttons of assembly 76 is pushed in. The assembly 76 may also contain another push button for stopping the impelling of the tape when desired. A lever 90 may be mounted adjacent the switch assembly 76 and mechanically linked with the arms 121 so that operation of the forward push button will rotate the lever 90 and pull the pads 120 down into operating position.

If desired, the recording and playback amplifier may be combined in which case the switch assembly 75 may be revised so as to suitably connect the altered amplifier input and output as required for recording or playback position. With such construction a supplementary playback amplifier and a supplementary recording amplifier may be used as taught in the application by Otto Kornei, Serial No. 685,092, filed July 20, 1946. This application also shows the switching arrangement which may be employed. It is, of course, understood that simultaneous recording and playback cannot be effected with such a combined amplifier arrangement.

Figure 10:
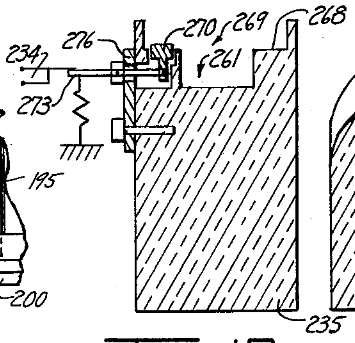
Fig. 10 is a cross-section of the guide member of Fig. 9 along the line 10—10.
Figure 9:
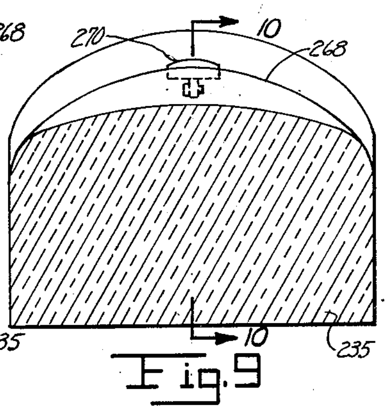
Fig. 9 illustrates a guide member of a different form of the invention.
Figure 4:
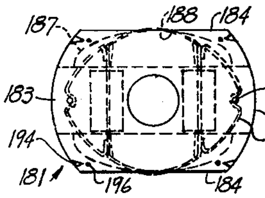
Fig. 4 is a side view of a mounting member for one of the magnetic cores of Fig. 1A, the magnetic core being shown in dotted lines.
Figure 5:
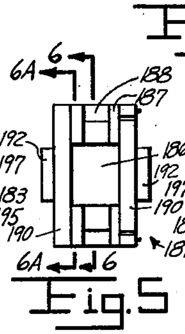
Fig. 5 is an end view of the mounting member of Fig. 4.
Figure 6:
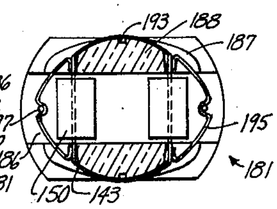
Fig. 6 is a cross-section of the mounting members of Figs. 4 and 5 along the line 6—6 and showing the magnetic core.
Figure 6A:
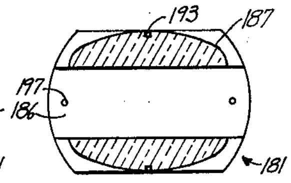
Fig. 6A is a cross-section of the mounting member of Figs. 4 and 5 along the line 6A—6A.

Figs. 9 and 10 indicate a guide structure for preventing inadvertent erasure of or superimposed recording on a commercial recording which it is desired to maintain intact in accordance with the invention. A guide structure 235 is shown as having two guide channels 261 and 269 in a manner analogous to the combined channel structure of Figs. 1 and 2. Shoulders 268 define the marginal regions in the floor of channel 269 and in one of these shoulders is mounted a pressure sensitive follower 270 which has a rounded upper surface and which is urged downwardly by the marginal portions of tape wide enough to be held away from the lower channel 261 by the shoulders 268. This downward movement of the follower 270 operates a switching arrangement 234 through lever arm 273. The follower 270 and the lever 273 operate in passageways in the guide structure 235, lever 273 being shown pivoted on a mounting plate 276 attached to the guide structure.

In operation a tape is under tension, and in moving over the guide structure 235 it depresses follower member 270, if of the necessary width, opening switch 234 so connected as to prevent the supply of erasing current to the erasing head as well as the supply of recording current to the recording head. Only two magnetic heads are required in this construction, the recording head being used as a playback head by providing suitable interchanging of leads by a switching arrangement which may, for example, be similar to that shown in the above mentioned Kornei application. The curved exposed portion of follower 270 may be a roller revolvably mounted around a pivot fixed to the slidable lower portion.

Two guide members 235 may be employed with the combined erasing head and the transducer head structure mounted between them, the guides then serving to properly center the tape over the pole pieces of the magnetic heads. The switch 234 may when actuated by the downward urging of follower member 270 merely open the B+ supply circuit to the oscillator and final recording amplifier.

The use of two guides of the type shown in Figs. 10 and 9 is necessary because in this construction the guide channels in the magnetic heads are too wide to properly center a narrow tape. The switch 234 may be of the micro type, requiring very little motion and force for actuation.

Figures 11, 12, 15, 16:
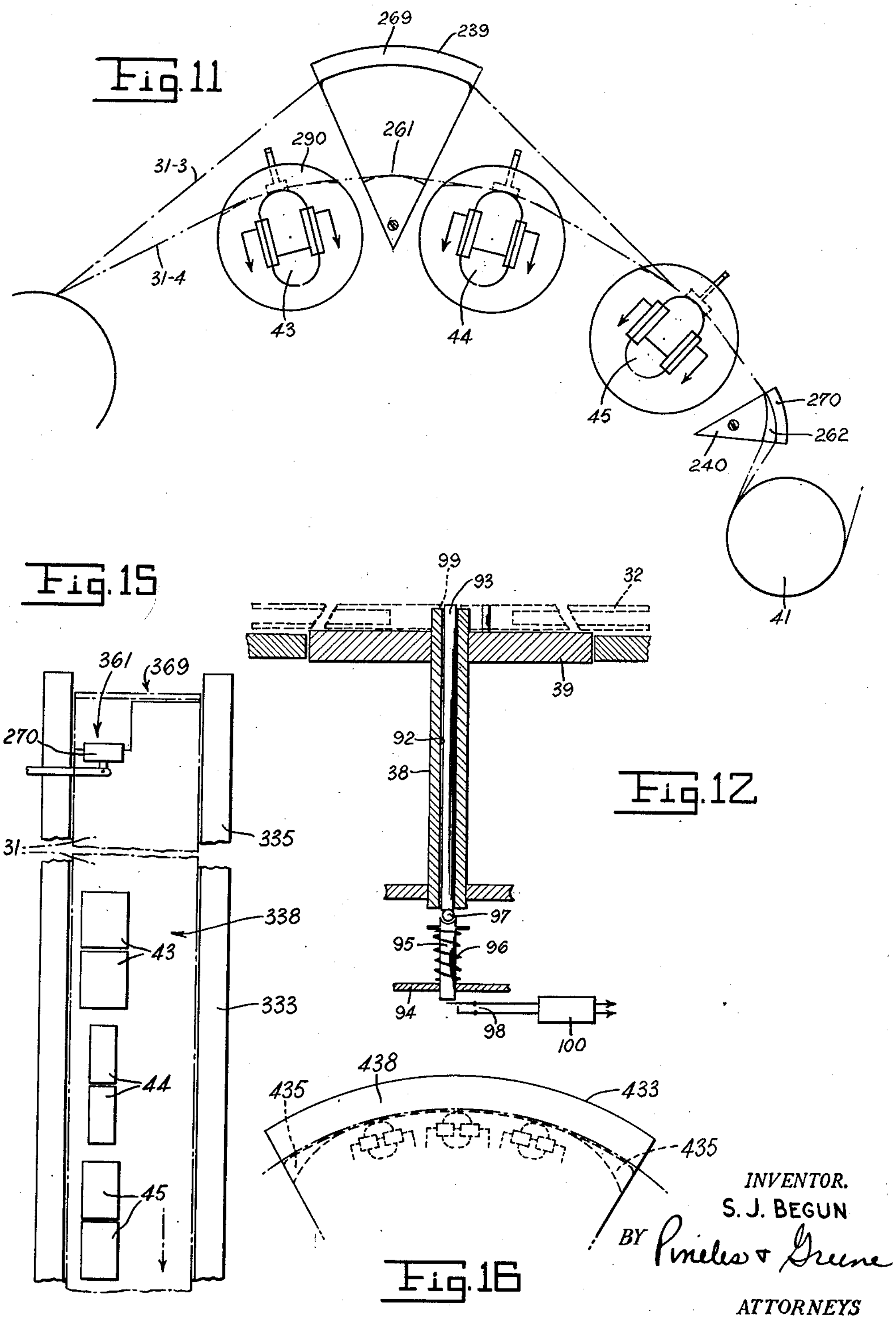
Fig. 11 is a top view similar to Fig. 1A of a modified form of the invention.
Fig. 12 is a sectional side view of a magnetic recording reel mounting structure of a further form of the invention.
Figs. 15 and 16 are diagrammatic representations of side and top views of another form of the transducing apparatus according to the invention.

Fig. 11 shows a modified construction of the invention in which the magnetic heads 43, 44, 45 are not mounted inside an integral head assembly containing a record track guide, but are separately mounted as shown. Two separate record track guides are mounted adjacent to the magnetic heads to define guide paths between the supply reel 32 and the capstan roller 41. A first guide unit 239 may be located between the erasing head 43 and the recording head 44, as shown, and provide two record track channels 261, 269 in a manner analogous to that shown in Fig. 2. The second guide unit 240 also provides two record track guide channels 262 and 270 in a similar manner. The magnetic heads 43, 44 and 45 may be similar to those shown in Fig. 1A, but may have their side walls extended upwardly to form record track guiding members 290. Pads 120 may be provided for better contact between the tape and the magnetic cores, as in Fig. 1A. The channels 269 and 261 in guide unit 239 should be spaced far enough apart so that the operation of the pads 120 does not interfere with the movement of the record track in either the outer guide path 31—3 or the inner guide path 31—4.

The second guide unit 240 may have its guide channels 262 and 270 more closely spaced and even meeting in one portion, as shown, and may be placed between the reproducing head 45 and the capstan roller 41.

So-called permanent recordings may be made on tape too wide to move along channels 261 and 252 so that it is directed into the outer guide path 31—3 by the channels 269, 270 of the guide units 239, 240. The guiding portions 290 of the magnetic heads 43, 44 may be wide enough to admit only the narrow record tracks, and the corresponding guiding portions 290 of reproducing head 45 may be wide enough to receive the wide record tracks.

Threading of the tape for the operation of the apparatus may be effected by simply guiding the tape from the supply reel over the periphery of the two guide units 239, 240, then around the capstan roller 41, and from there onto the take-up reel in a manner similar to that shown in Fig. 1. Beginning of the reeling operation will cause tensioning forces to appear in the portion of the record track between the supply reel 32 and the capstan roller 41, and these tensioning forces will urge the record track inwardly toward the magnetic heads. The guide unit 239 will control this inward motion of the record track, stopping it at the outer guide path 31—3 if it is wider than the critical width and permitting it to move to the record track path 31—4 if it is narrower than the critical width. The guide unit 240 merely acts as an additional guiding means so as to properly center the narrow record tracks in their passage across the reproducing head 45.

The apparatus of Fig. 11 operates in a manner similar to those shown in Figs. 1 and 1A, and may be used with the amplifiers shown in Fig. 1 or Fig. 8.

The magnetic tapes of differing widths may be supplied on reels or holders having different tape receiving dimensions but of the same overall width. The narrow tape receiving spacing may be centrally disposed with respect to the wide tape receiving spacing to insure the proper feeding of the narrow tape path along the transverse central portion of the wide tape path. If desired, however, the tapes may be supplied on reels of different overall widths, in which case two levels of reel mounting may be provided on the reel mounting shafts 38.

According to another phase of the invention, inadvertent erasure or superimposed recording may be prevented by providing the supply reel 32 with a specially shaped portion to which the transducing apparatus is sensitive. With such construction, record tracks may be of identical physical characteristics.

Fig. 12 shows one form of such an apparatus. The rotatable collar 39 and shaft 38 on which the reel 32 is mounted are driven by belt 90 frictionally engaging pulley 91 affixed to shaft 38. The shaft 38 has a central longitudinal aperture 92 extending through the entire shaft and receiving rod 93. Slidably mounted on a supporting member 94 under the shaft 38 is a follower 95 biased upwardly by a spring 96, as shown. The top of follower 95 is recessed to accommodate a ball 97 which contacts the rod 93 urging it to its higher position where the top of the rod 93 extends above the top of the shaft 38. Immediately below the lower end of the follower 95 a switch 98 is mounted so that in the "up" position of rod 93 switch 98 is opened, and when 93 is moved downwardly switch 98 is closed.

Reels 32 may be provided in two different shapes, one containing an aperture 99 in the upper portion of the hub, as shown in Fig. 12, and the other being imperforate in the corresponding location. Mounting of the reel having an aperture 99 will permit the rod 93 to project through the aperture 99 to its highest position, thereby leaving the switch 98 open. Mounting of a reel having no aperture corresponding to the aperture 99 will force the rod 93 downwardly to close the switch 98. The switch 98 may be connected with relay means 100 to prevent the application of erasing or recording flux to the record track unreeling from the reel.

In the guide construction of Figs. 1A, 9 and 11 the outer guide-path defining shoulders 168, 268, or 269 act as sensing devices responsive to the width of the tape for directing the wider tape along one path and permitting the narrower tape to traverse another path.

Although Figs. 1 through 12 are shown as employed with record tracks in the form of a tape, similar constructions may be used for wire type magnetic record tracks in accordance with the invention. A wire guide path may be defined by a grooved guide structure in which the groove admits a narrow wire but does not permit the entry of a wider wire. The pads 120 are unnecessary for use with wire type record tracks.

Fig. 13 illustrates another apparatus according to another phase of the invention in which there is a sensing device that responds to the surface conductivity of the magnetic record track. In this modification a composite guide structure 335 is provided in the guide path of the record track. The guide structure 335 is formed of two electrically conducting side members 340, 341 fastened to both sides of a central non-conducting member 343. The guide portion of the guide structure 335 is formed by the upper cut-away region of the side members 340, 341 which provide the marginal portions of a floor generally continuous with the upper edge of intermediate member 343. The magnetic record track used with the construction of Fig. 11 may be of the above mentioned type described in the Kornei application, Serial No. 685,092, filed July 20, 1946, since the bonded magnetic powder layers of such a tape do not in general have any appreciable electrical surface conductivity. Both commercial and home recordings may then be made on tapes of the same width and in general of the same physical characteristics with the exception that the tape used for home recording may have a thin superficial coating of electrically conductive material which contacts and electrically connects the side members 340 and 341 to close a circuit which permits the application of erasing and recording current to the tape. The commercial recordings having no such electrically conductive coating will thereby be safeguarded against inadvertent damage.

The differentiating electrically conductive coating need only be applied to a leader portion of the tape, such as the leader portion used for threading, and the closing of the circuit between side members 340, 341 may be interlinked with the recording controls in such manner that these controls cannot be set to the record position without the action of a relay operated by the circuit through the side members. A self-locking relay placed in this circuit, in one instance, may be so connected as to hold the record switch in the record position from which it is otherwise biased by a spring, and a reeling limit switch operated by the unreeling of all the tape from a supply reel, for example, may unlock the relay. Alternatively, the electrically conductive coating may be applied over the entire length of the tape in which case it is preferred to have the electrically conductive coating on the surface of the tape which is opposite to the surface that contacts the magnetic heads. It is obvious, of course, that various other types of electrically conducting guide members may be employed to make it unnecessary for the conductive coating to extend the entire width of the tape.

Figure 14:
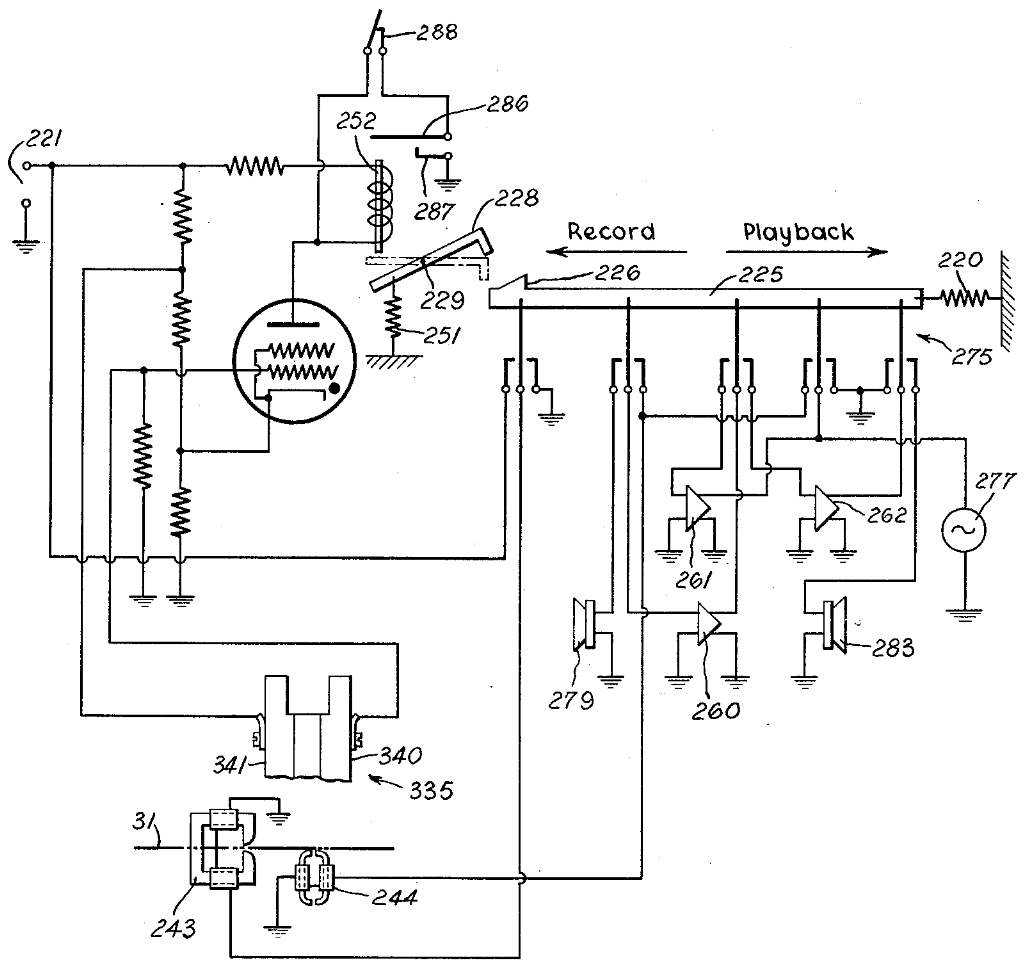
Fig. 14 illustrates a wiring diagram suitable for use with the form of the invention illustrated in Fig. 13.

Fig. 14 diagrammatically illustrates one form of a control apparatus according to the invention. In this arrangement, the control may be exercised by a leader strip of tape attached to the reel of magnetic recording tape, which leader strip may or may not be provided with an electrically conductive coating to determine whether or not recording should take place. The guide unit 335 is similar to that shown in Fig. 11, and the magnetic erasing head 243 and the magnetic recording-reproducing head 244 are positioned in the guide path defined by the guide assembly 335. A source of signals, such as the microphone 279, a sound reproducer, such as the loud speaker 283, amplifiers 260, 261, and 262 as well as high frequency oscillator 277 are interconnected with the recording-reproducing head 244 through a multipole switch assembly 275 which may be operated to a left-hand record position or a right-hand playback position and is biased toward the playback position by spring 220. In the right-hand playback position, as shown in the figure, the recording-reproducing coil is connected to the input of main amplifier 260, the output of main amplifier 260 is connected to the auxiliary correcting playback amplifier 262, the output of which in turn is connected to the sound reproducer 283 by the various contacts of the switch 275. In the left-hand record position the signal source 279 is connected to the input of the main amplifier 260, the output of which is fed through the auxiliary correcting recording amplifier 261 to the recording-reproducing head 244 together with the output of a high frequency oscillator 277. The output of the high frequency oscillator 277 provides a high frequency A. C. bias for suitably recording the amplified signals originating in the signal source 279, as is well known in the art. In the left-hand record position one of the switch blades also connects the erasing head 243 with a source of 60-cycle A. C. current 221, as shown. All the circuits are indicated as completed by ground connections.

The erasing head 243 is so disposed as to provide in the path of the magnetic record track 31 a magnetic field which is relatively intense and which has suitable decay characteristics so that each elemental portion of the record track 31 is subjected to a saturating magnetic field followed by at least about three cycles of decaying magnetic field and is effectively demagnetized for proper recording of the signal flux impressed by the recording-reproducing head 244.

The multi-blade switch 275 is provided with an actuating member 225 containing a cam-shaped projection 226 so positioned as to be engaged by a latch lever 228 when the latch lever is rotated around a pivot 229 to the clockwise latching position shown by dotted lines in the figure. The latch lever 228 is biased to the counterclockwise position shown in full lines, by the spring 251, and is rotated to the dotted clockwise position by the relay winding 252 under the influence of the conventional electron tube relay circuit indicated. The relay circuit is so connected with the conductive side plates 340, 341 of the guide assembly 335 that when no electrically conductive material joins the side plates 340, 341, the relay winding 252 is inactivated and the switch actuating member 225 cannot be retained in the left-hand record position. On the other hand, when electrically conductive material, such as a magnetic record track leader strip surfaced with a conductive coating, contacts the conductive side plates 340, 341 the relay winding 252 is activated, the latch lever 228 assumes its dotted line position, and the switch actuating member 225 may be retained in the record position.

The relay winding 252 is shown as provided with an additional switch blade armature 286 which together with its associated contact 287 acts to shunt the relay circuit so as to lock the winding 252 in its activated position even though the relay circuit through the guide plates 340, 341 is opened. A switch 288 is placed in this locking circuit and may be connected with a limit switch so as to open the locking circuit when the magnetic record track is moving in a reverse direction in its guide path, as for example, when it is being rewound after a forward reeling operation.

With the circuit of Fig. 14 a magnetic record track provided with an electrically conductive leader strip may be threaded along a guide path so that the leader strip contacts the side plates 340, 341 of the guide assembly 345, and the switch 275 may then be placed and maintained in its record position so as to enable erasing and/or recording on the record track. The circuit will maintain the switch 275 in the record position until such time as the record track movement is reversed to open the switch 288. A record track provided with a leader strip that is not electrically conductive will not permit the maintenance of the switch 275 in the record position so that the record track will not be inadvertently erased or have another signal superimposed.

Any other physical property may be used for controlling the erasing and/or recording on a record track. Light reflecting properties may be altered by suitable coatings and may be used in conjunction with photoelectric cells as a sensing device. Furthermore, the recording medium may be provided along one edge with a series of perforations and a source of light so placed that an interrupted beam through these perforations will impinge on a photocell and supply current to actuate a relay which requires actuation for rendering the apparatus capable of erasing or making new recordings.

The specific inductive capacity of the tape may be also used to control the recording and/or erasing operation. A sensing device, such as the capacitative elements of an oscillator may be so arranged that the tape passes between them and causes oscillation and signal generation when the dielectric constant of the tape has the proper value. The signal generated by the oscillator may in addition to controlling the operation of an erasing or recording relay be amplified to provide the erasing current and A. C. biasing current that is superimposed on the currents to be recorded. Commercial recordings may be made on metal tapes or tapes having an unsuitable dielectric constant.

A further modification according to the invention is one in which a signal may be superimposed on the signals to be recorded and may be used to operate a sensing device responsive to this signal in the playback output for controlling erasing and/or recording operations. This control signal should be of a frequency outside the desired frequency playback response limits but within the pick-up limits of a magnetic pick-up head. The frequency of the control signal should not be high enough to be of erasing or biasing frequency, nor low enough to be undetectable. A filtering stage may be interposed in the playback circuit to segregate the control signal so that it does not appear in the final output and to feed the control signal, amplified if necessary, to relay means controlling erasing and/or recording circuits. A special reproducing head may be provided so that the recording medium has to pass this head before it reaches the erasing and recording heads. This special head may be designed for maximum response to the control signal frequency. If the control signal appears on the tape erasing and recording may take place. The recording apparatus of home recorders may be equipped to superimpose the control signal during a recording process. If desired, the control signal may be manually controllable so that it may be omitted when the home recorder is to make a permanent recording.

The pole face width of the erasing core may be wider than the corresponding widths of the recording core and playback core to insure that all recording and playback be effected on record track that has been properly erased. Furthermore, when different recording and playback cores are used, as shown for example in Figs. 1 through 8, it is highly advantageous to make the pole face width of the recording core different from the corresponding width of the playback core. Making these cores of the same width permits slight variation in alignment of one core with respect to the other to greatly effect the playback level since part of the recorded signals will be out of range of the playback core. However, a difference in width enables the maintenance of constant playback level in spite of appreciable misalignment. If the pole faces of the recording core are the wider ones, the playback pole faces will respond to a constant width of recorded signals so long as the misalignment still maintains the playback pole faces within the limits of the width of the recording pole faces. If the playback pole faces are the wider ones, the entire recorded signal width will be played back so long as misalignment still maintains the playback pole faces spanning the entire width of the recording pole faces. Fig. 15 shows one suitable arrangement of transducing cores in which the record track 31 moves in the direction indicated by the arrow across the erasing core 43, the recording core 44 and the playback core 45.

In place of the magnetic cores shown in Figs. 1A and 4 through 6A, other cores such as those shown in the Begun application Serial No. 688,738 filed August 6, 1946, which issued as Patent Number 2,513,617 on July 4, 1950, may be used. The ring shaped cores formed of only a single lamination of sheet metal of a thickness of the order of four to fourteen mils, having only a small non-magnetic gap, and extending substantially entirely on one side of the record track guide path are especially useful in that they are extremely sensitive and efficient.

According to another form of the invention, the transducing head may be arranged for operation with record tracks of two different widths by providing guide surfaces disposed so as to have the narrower width along a marginal portion of the wider width. This is especially useful where the wider record track is about twice as wide as the narrower and can supply two recording channels, one in each of its marginal regions.

Fig. 15 diagrammatically indicates such construction in which the transducing head 333 has the erasing, recording and reproducing cores 43, 44 and 45 respectively mounted along a lateral half of the record track guide path 338. Separate guides 335 may be mounted on both sides of the transducing head 333 to provide a wider 339 and the narrower channel 361 as shown. In the narrower channel 361 a sensing member 270 may be located as shown in Figs. 9 and 10 for example.

The sensing member 270 may be connected so that when engaged by a narrow record track it causes actuation of the erasing core 43 as well as recording core 44, the narrow record track being simultaneously lead into magnetic linkage with all the cores. The wider record track 31, as illustrated, is lead through the wider guide paths 369 and 338 and out of contact with the sensing member 270. According to this form of the invention, the wider record tracks may be provided with two non-erasable recordings, one in each lateral half, so that after it is completely reeled through a transducing operation, the reeled-up record track may be simply turned around and re-reeled from th supply reel mounting to transduce a recording on the second channel.

This procedure is similar to that used in making eight millimeter photographic records on a film track sixteen millimeter wide. An important advantage in this form of the invention is that a time-consuming rewinding operation may be dispensed with in many instances.

If desired, the commercial non-erasable recordings may be prepared on the narrower tape with corresponding modification of the connections to the sensing member 270. As illustrated, the erasing core 43 has a pole face width larger than that of the play-back core 45, which in turn is larger than that of the recording core 44, as indicated above.

With this operation, the record track reeling should be so arranged that the unwinding from the supply reel be in the same direction as the winding on the take-up reel, as shown in Fig. 1A for example. When employing a record track in the form of a non-magnetic carrier having a bonded coating of magnetizable particles, the bonded coating should be on the core side of the carrier for transducing from either channel and a reeling such as is shown in Fig. 1 will effect reversal of the coating position.

The guides may be incorporated as part of a unitary assembly structure including the transducing head, as shown in Fig. 16 where the ends of the guide path 438 of the assembly 433 provide the two-level guide regions 435. With either construction both the wider and narrower record tracks are maintained in contact with all the magnetic cores during any reeling along the guide path 338 or 438, inadverent damage being prevented by the action of the sensing member 270.

It is understood that the desired distinguishing physical characteristic to which the sensing device is responsive for controlling the recording and/or erasing circuits may be imparted to either the commercial non-erasable recording or to the home type erasable recording, the controlling circuits being suitably adjusted. When the presence of the distinguishing physical characteristic may be accidentally simulated it may be preferred to use this physical characteristic when present to prevent recording.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In a magnetic record transducing apparatus for recording or reproducing signals on moving permanently magnetizable elements of a magnetic recording medium: a guide structure including guide elements and impelling means for impelling a record member along a predetermined guideway during a record transducing operation; record transducing means including head means having transducing windings and magnetic core elements interlinked with said windings and having exposed magnetic coupling surface elements through which said windings are interlinked with successive surface portions of a record member impelled along said guideway for transducing magnetic record signals by magnetic interlinkage between said windings and successive portions of said record member; said record transducing means including control means settable in a recording condition for causing said head means to impress through said core elements a magnetizing flux and record magnetic signals on successive portions of a record member impelled along said guideway; said control means being also settable in a reproducing condition for causing said record transducing means to reproduce magnetic signals corresponding to magnetic flux signals impressed by successive portions of a record member moving along said guide way; said guide structure being arranged for interchangeable cooperation with a first record structure and also with a second record structure, each of said two record structures comprising a permanently magnetizable record member which is impelled in an operative record transducing condition along said guide way for reproducing magnetic signals from a record member of either of said record structures when said control means is set in a reproducing condition, and one of said two record members having at least one physical distinguishing element differentiating said one record member from the other record member; said guide structure including preventive means having at least one sensing element means connected to said preventive means and responsive to differentiating action of said distinguishing element for actuating said preventive means to prevent the record member of one of said two record structures from being exposed to a magnetizing flux of said core elements and prevent magnetization of the record member thereof while impelled along said guide way during a record transducing operation irrespective of the setting of said control means.

2. In a magnetic record transducing apparatus for recording or reproducing signals on moving permanently magnetizable elements of a magnetic recording medium: a guide structure including guide elements and impelling means for impelling a record member along a predetermined guideway during a record transducing operation; record transducing means including head elements having transducing windings and magnetic core elements interlinked with said windings and having exposed magnetic coupling surface elements through which said windings are interlinked with successive surface portions of a record member impelled along said guideway for transducing magnetic record signals by magnetic interlinkage between said windings and successive portions of said record member; said record transducing means including control means settable in a recording condition for causing said record transducing means to impress through said core elements a magnetizing flux and record magnetic signals on successive portions of a record member impelled along said guideway; said control means being also settable in a reproducing condition for causing said record transducing means to reproduce magnetic signals corresponding to magnetic flux signals impressed by successive portions of a record member moving along said guide way; a first permanently magnetizable record member and a second permanently magnetizable record member for interchangeable engagement with said guide structure to be impelled in an operative record transducing condition along said guide way for reproducing magnetic signals from either of said two record members when said control means is set in a reproducing condition; one of said two record members having at least one physical distinguishing element which is absent from the other record member and which differentiates said one record member from the other record member; said guide structure including preventive means having at least one sensing element means connected to said preventive means and responsive to differentiating action of said distinguishing element for actuating said preventive means to prevent one of said two record members from being exposed to a magnetizing flux of said core elements and prevent magnetization of the record member thereof while impelled along said guide way during a record transducing operation irrespective of the setting of said control means.

3. In a magnetic record transducing apparatus as claimed in claim 1, an element of one of said two record members having an electric conductivity differentiating said one record member from the other record member and said sensing element being responsive to the differentiating action of said electrical conductivity of said distinguishing element of said two record members.

4. In a magnetic record transducing apparatus as claimed in claim 3, substantially the entire magnetic core structure of said core elements being held along one side of the record member impelled along said guide way, so that each of said record members may be freely removed from its operative position along said core members.

5. In a magnetic record transducing apparatus as claimed in claim 1, an element of one of said two record members having a magnetic characteristic differentiating said one record member from the other record member and said sensing element being responsive to the differentiating action of said magnetic characteristic of said distinguishing element of said two record members.

6. In a magnetic record transducing apparatus as claimed in claim 5, substantially the entire magnetic core structure of said core elements being held along one side of the record member impelled along said guide way, so that each of said record members may be freely removed from its operative position along said core members.

7. In a magnetic record transducing apparatus as claimed in claim 2, an element of one of said two record members having an electric conductivity differentiating said one record member from the other record member and said sensing element being responsive to the differentiating action of said electrical conductivity of said distinguishing element of said two record members.

8. In a magnetic record transducing apparatus as claimed in claim 7, substantially the entire magnetic core structure of said core elements being held along one side of the record member impelled along said guide way, so that each of said record members may be freely removed from its operative position along said core members.

9. In a magnetic record transducing apparatus as claimed in claim 2, an element of one of said two record members having a magnetic characteristic differentiating said one record member from the other record member and said sensing element being responsive to the differentiating action of said magnetic characteristic of said distinguishing element of said two record members.

10. In a magnetic record transducing apparatus as claimed in claim 9, substantially the entire magnetic core structure of said core elements being held along one side of the record member impelled along said guide way, so that each of said record members may be freely removed from its operative position along said core members.

S. J. BEGUN.

REFERENCES CITED

The following references are of record in the file of this patent:

UNITED STATES PATENTS

| Number | Name | Date |
|---|---|---|
| 2,235,132 | Wooldridge | Mar. 18, 1941 |
| 2,351,006 | Camras | June 13, 1944 |
| 2,466,514 | Vagtborg | Apr. 5, 1949 |